(12) United States Patent
McLean

(10) Patent No.: US 8,720,377 B1
(45) Date of Patent: May 13, 2014

(54) CONTAINER AND METHOD FOR ACCLIMATING ANIMALS OR PLANTS

(76) Inventor: Stephen J. McLean, Longmont, CO (US)

( * ) Notice: Subject to any disclaimer, the term of this patent is extended or adjusted under 35 U.S.C. 154(b) by 331 days.

(21) Appl. No.: 13/105,175

(22) Filed: May 11, 2011

(51) Int. Cl.
*A01K 63/00* (2006.01)
*A01K 63/02* (2006.01)

(52) U.S. Cl.
USPC ............... 119/251; 119/225; 119/250

(58) Field of Classification Search
USPC .......... 119/201, 203, 224, 225, 246, 247, 248, 119/249, 250, 251, 269
See application file for complete search history.

(56) References Cited

U.S. PATENT DOCUMENTS

| | | | |
|---|---|---|---|
| 276,392 A * | 4/1883 | Gregory .................. | 119/468 |
| 727,454 A * | 5/1903 | Royce ..................... | 119/534 |
| 1,331,908 A | 5/1916 | Frey | |
| 2,717,577 A | 5/1954 | Petsche | |
| 2,720,188 A | 5/1954 | Hofrichter | |
| D174,366 S | 3/1955 | Ziskind | |
| 2,796,043 A | 5/1956 | Daniel | |
| 3,485,373 A * | 12/1969 | Powers ................. | 210/167.27 |
| 3,491,722 A * | 1/1970 | Levitov et al. .......... | 119/251 |
| 3,512,503 A * | 5/1970 | Willinger ............... | 119/251 |
| 4,029,050 A * | 6/1977 | Genest ................... | 119/201 |
| 4,188,909 A | 2/1980 | Spivak | |
| 4,953,503 A | 9/1990 | Lundquist | |
| D311,933 S | 11/1990 | Adams | |
| 5,228,411 A | 7/1993 | O'Rourke | |
| 5,265,557 A | 11/1993 | Lovitz | |
| D353,693 S | 12/1994 | Lawson | |
| 5,487,360 A | 1/1996 | Yau | |
| D371,226 S | 6/1996 | Lee | |
| D386,834 S | 11/1997 | Nissim et al. | |
| 6,131,865 A | 10/2000 | Adams | |
| 6,578,525 B2 | 6/2003 | Engelking et al. | |
| 6,640,749 B1 | 11/2003 | Monnier | |
| 7,059,270 B1 * | 6/2006 | Loginov ................ | 119/51.04 |
| D565,251 S | 3/2008 | McLean | |
| 1,616,579 A1 | 7/2009 | Kadowaki | |
| 8,156,898 B2 * | 4/2012 | Luong et al. ............ | 119/251 |
| 2006/0094568 A1 | 5/2006 | Underbrink et al. | |
| 2006/0162671 A1 | 7/2006 | Neuer | |
| 2007/0051319 A1 | 3/2007 | Axelrod | |
| 2007/0227459 A1* | 10/2007 | Gould .................... | 119/248 |
| 2009/0107409 A1 | 4/2009 | Yu | |

* cited by examiner

*Primary Examiner* — David Parsley

(74) *Attorney, Agent, or Firm* — Patent Law Offices of Rick Martin, P.C.

(57) ABSTRACT

An aquarium transfer container has an inner container with holes therein. A double siphon is created from the aquarium to the transfer container and then from the transfer container to drain. When all the foreign water in the transfer container has been replaced with aquarium water, the inner container is lifted out and set inside the aquarium to release the transferred fish/plant.

8 Claims, 10 Drawing Sheets

CONTAINER AND METHOD FOR ACCLIMATING ANIMALS OR PLANTS

FIELD OF INVENTION

The present invention relates to providing a transport container adjacent to an aquarium, wherein a dual siphon arrangement gradually introduces a metered amount of aquarium water into the transport container and removes it at the same rate.

BACKGROUND OF THE INVENTION

One type of aquarium that developed over time is the marine aquarium, built for housing marine plants and animals. The primary difference between marine aquaria and freshwater aquaria is the saltwater environment that must be maintained in a marine aquarium. Marine aquaria hold various fish, marine invertebrates, and other organisms that are important in scientific research and as a part of the hobby for aquarists. Hence, much innovation surrounds the improvement of marine aquaria, and presently the chemical condition of an aquarium can be precisely maintained for the more sensitive marine organisms that may be housed there.

Common measurements indicative of the chemical condition of the liquid environment in a marine aquarium include temperature, specific gravity (generally maintained between 1,020 and 1,026), salinity (a measure of the NaCl content of the water, generally maintained between 20 and 32 parts per thousand), pH (a measure of the hydrogen ion content of the water, generally between 8.1 and 8.3) and carbonate hardness (or carbonate alkalinity) (generally between 8 and 12 degrees KH). Other conditions that may be tested include calcium levels, alkalinity, iodine levels and other trace materials. In addition, ammonia from organism waste and decaying matter is constantly being converted to nitrite and nitrate, and every aquarium has a different level of biological loading.

Because of differences in these and other water parameters, the environment varies from aquarium to aquarium. This presents a problem when a fish or other type of animal or plant are sensitive to subtle changes in environment, and need to be transported from one aquarium to another. As we are an increasingly mobile society, many individuals and families relocate for work, school, or family. Oftentimes the marine animals and plants must make the move as well. The move will oftentimes entail a first move to a temporary moving or transport tank, and a second move to the new destination tank. Perhaps most importantly, whenever a fish is purchased the same transport steps must occur.

The shock experienced by the animal, due to sudden changes in water condition can cause grave injury, long-term illness, or death, and worse, it can occur in a matter of seconds. The loss of the organism is not only emotionally and financially detrimental to the owner, but it can have an impact on the greater ecosystem as well, since to lose such organisms in captivity increases the demand on such organisms harvested from the wild, and consequently the environmental damage resulting from such harvesting.

To prevent such injuries, the original source water is often kept with the fish during transport. If the environment to which the fish is transported is not composed only of the source water from which the fish was taken, there will be some degree of mixing, and some degree of an environment change for the fish to withstand. To minimize the acclimation stress, as much of the source water as is practical is taken to the new location. Additionally, the new environment's parameters are often matched as closely as possible to the source environment. The four parameters generally recognized as most important are temperature, salinity, alkalinity and pH.

Generally, the new environment cannot be exactly matched to the old. To further prevent injuries due to shock, fish should be slowly acclimated to their new environment so that the change is gradual and tolerable.

Methods and devices have been employed to further reduce the risk of shock to fish during transport from a first environment to a second. The traditional and most common method involves floating a container, generally a plastic bag in which the organism was transported, for a period of up to one hour in the new aquarium. This allows the water temperature inside and outside the bag to equilibrate. Water from the tank is then added to the bag in a slow, stepwise manner until the water within the bag more closely matches the water in the new aquarium. The fish are then removed from the bag and placed in the new environment. This method is often satisfactory, but requires a fair amount of work on the part of the person relocating the fish, and still subjects the fish to stepwise changes that may be stressful. It is not an ideal method, and many animals and plants are harmed and eventually die due to this inadequate method.

An improvement upon the technique outlined above is similar, except the step-wise addition of water is replaced with the slow siphoning of water through small caliber tubing. The aquarium water is dripped into the bag at a very slow rate, measured in drops per minute. This allows water from the new aquarium to slowly mix with water in the transport bag. This technique is not without its drawbacks either. There is high risk of overflowing the transport container if it is left unattended, resulting in a damaging spill of salt water and possible loss of the fish. It is also difficult to assess the proper flow rate for the siphon, which can lead to overly fast changes in water parameters.

Several devices have been disclosed that also attempt to address these problems. U.S. Pat. No. 4,188,909 (Spivak) discloses a plastic device comprising multiple separate chambers into which water and the fish from the source aquarium are placed. The device is then placed along an inside wall of the new aquarium. A quantity of water is poured into a separate chamber on the device. Then, via a valve, water from the separate chamber is allowed to slowly enter the chamber containing the marine organism being relocated. Once the gradual dilution of source aquarium water is complete, and the temperature has equalized to that of the water in the destination aquarium, the device may be opened to allow the inhabitant to swim out.

Spivak operates similarly to the second technique described above, and suffers from some of the same drawbacks. Additionally, this technique allows water from the source aquarium to mix with water from the destination aquarium. Mixing of this sort is generally avoided by aquarists because it increases the chance that pathogens may enter the destination aquarium. Additionally, the device is large and bulky and may not fit on many aquarium installations. Finally, the device requires user input in operating the valve, increasing the chance for error. Acclimation by stepwise introduction of water is disclosed again in U.S. Pat. No. 6,640,749 to Monnier, Pub. No. U.S. 2009/0107409 discloses a transfer bag with a window of a dialysis membrane. A slow seepage of aquarium water into the bag acclimates the fish slowly.

What is needed in the art is a safe, rigid transport container that slowly acclimates new animals and plants into an aquarium without letting any water from the transport container enter the aquarium.

The present invention meets this need with a plastic transport container that attaches to the aquarium. A double siphon adds water from the aquarium into the transport container and then once mixed is removed at the same rate into a waste water drain. The rate of acclimation can be fine tuned with a control valve, and the system can be left unattended until complete exchange of the waters. After a period of time, all the water within the transport tank would be completely exchanged with aquarium water, completely eliminating the stress of a stepwise exposure of the animal or plant.

SUMMARY OF THE INVENTION

The main aspect of the present invention is to provide a transport container mounted internally or externally on an aquarium, wherein a double siphon drains aquarium water into the transport container, and then a second tube drains water from the transport container to a waste water drain at equivalent.

Another aspect of the present invention is to provide an inner container to allow lifting it directly into the aquarium for transfer without introducing any of the original transport container water into the aquarium.

Another aspect of the present invention is to provide a divider in the inner container to isolate animals or plants.

Another aspect of the present invention is to provide holes in the inner container to use it as a bristle worm trap.

Another aspect of the present invention is to provide holes in the inner container to use as an isolation tank inside the aquarium.

Another aspect of the present invention is to provide a flow control valve on the exiting siphon to allow fine turning of the acclimation rate.

Other aspects of this invention will appear from the following description and appended claims, reference being made to the accompanying drawings forming a part is this specification wherein like reference characters designate corresponding parts in the several views.

Operation

For Transportation:
Setup:
  Place the inner tank inside the outer tank.
  Install one end of the short siphon tube in the top of the lower metering guide and the other end inside the transport container.
  Remove the flow control valve and long tube from the inner tank tube if it was previously connected.
Have the store fill the transport container to about the top of the inner tank as the plant or animal is placed into it.
Slide the lid on (tuck the short siphon tube out of the way) and secure it with the look and loop strap.
For Acclimation:
Setup:
  Be sure that one end of the short siphon tube is installed into the top of the lower metering guide.
  Note: If you're not using the transport container for transporting. Remember to fill the store's transport bag with enough water to almost fill the transport container. It must be filled at least a little higher than the top of the upper metering guide.
  Important: wipe the face of the aquarium and the suction cups with a damp towel prior to attaching the transport container.
  Position the top edge of the transport container about a ¼" above the water level in your aquarium.
  Secure the transport container to the aquarium face by FIRMLY pushing on the transport container until the suction cups are fully compressed.
  Connect the Flow Control Valve (with the long siphon tube) to the inner tank tube. Since this is a temporary connection it is not necessary to push the tube beyond the barb on the valve.
  Position a drain container on the floor below the transport container. Place the free end of the short siphon tube below water level in the aquarium. Open the Flow Control Valve fully (the arrow points along the tubes).
Acclimation Steps
1. Ensure the flow control valve is fully open. Draw a suction on the free end of the long siphon tube and place the end in the drain tank. At this time the water flowing will be 100% aquarium water.
2. Using a ¼ cup measuring cup, adjust the valve until the flow fills the cup in 20-40 seconds. This will be a steady stream (Once you've acclimated a couple of times you'll be able to judge the rate without needing the measuring cup).
3. Remove the short siphon tube from the top of the lower metering guide and place that end into the open hole in the upper metering guide until the tube is fully in the metering guide. NOTE: to avoid losing the siphon it is important that the tube end in the aquarium stays submerged during this step and the other end not be raised above the level of the aquarium water during the transfer between the metering guides.
4. Now you're acclimating. Monitor the level in the transfer container for a few minutes. Depending on the flow rate and the variance in the aquarium and transfer container beginning water levels, the water level in the transfer container may rise or lower ¼ inch or so, but then will settle into a steady position. At the ¼ cup-per-20 second flow rate you'll have changed out one transfer container volume (1.5 gallons) in one hour. This is sufficient for most fish. For the inverts and corals you may want more time and/or a slower drip rate like ¼ cup-per-40 second rate. If unsure, just acclimate for a longer period of time to be safe.
5. That's it. After you've completed acclimating remove the short siphon tube from the upper metering guide, lift the inner tank from the outer tank, draining the water in the transport tank and release your fish into the aquarium.
For Trapping:
Setup:
  Depending on your preference for method of release, the transfer container inner tank may be placed inside the outer tank.
  Tie the fishing line to the small hole in the lid. Add the proper bait into the transfer container.
Immerse the transfer container in the aquarium so that the lid can slide vertically such that the fishing line can be used to pull open the lid and release it as a trap door once the creature has been lured into the tank.
If you're attempting to capture a fish, the suction cups can be used to secure the transfer container into the aquarium inner wall off of the floor to help avoid luring the bottom dwellers.
As an Isolation Tank:
Setup:
  Install the 4 small suction cups onto the inner tank.
  If installed, remove the short siphon tube and the flow control valve/long from the inner tank.
Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
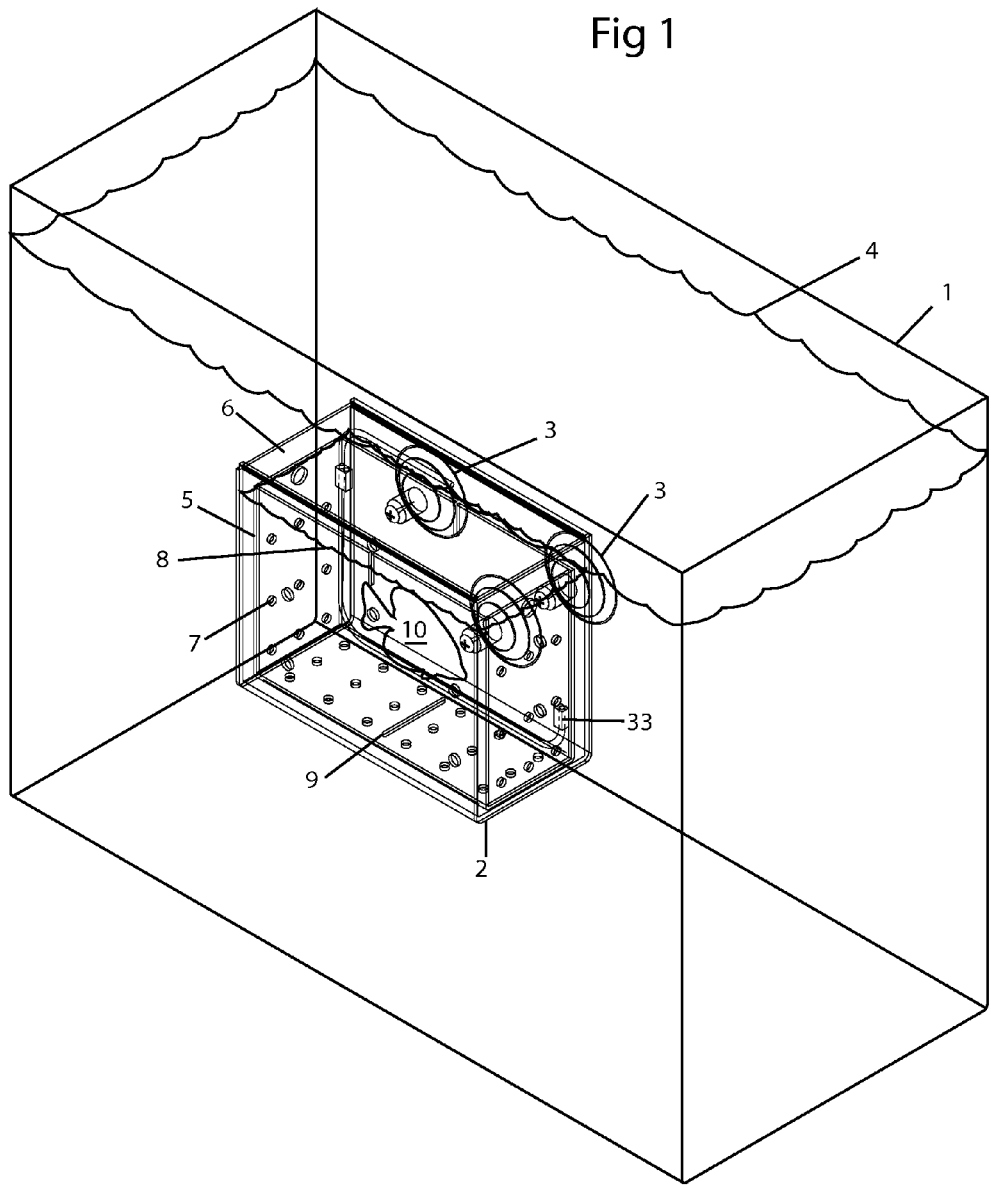
FIG. 1 is a top perspective view of the preferred embodiment transport container mounted to the exterior of an aquarium. Transport container can be mounted on interior of aquarium as well.

In FIG. 1 the aquarium 1 may have expensive and sensitive fish, animals and plants not shown. Water in the transport container 2 would pollute the water in the aquarium 1. Suction cups 3 hold the transport container 2 firmly in place slightly above the water line 4. An inner container 5 is smaller than the transport 2, and it rests on the bottom of the transport container. A gap 6 between containers 2, 5 is formed. Holes 7 and the gap 6 allow for a common pool of water in containers 2, 5 so that transplant fish 10 can swim in the confines of the four vertical walls 20, 21, 22, 23 (see FIG. 2) of the inner container 5. Slots 8 and slot 9 support an optional divider 24 shown in FIG. 2.

Figure 2:
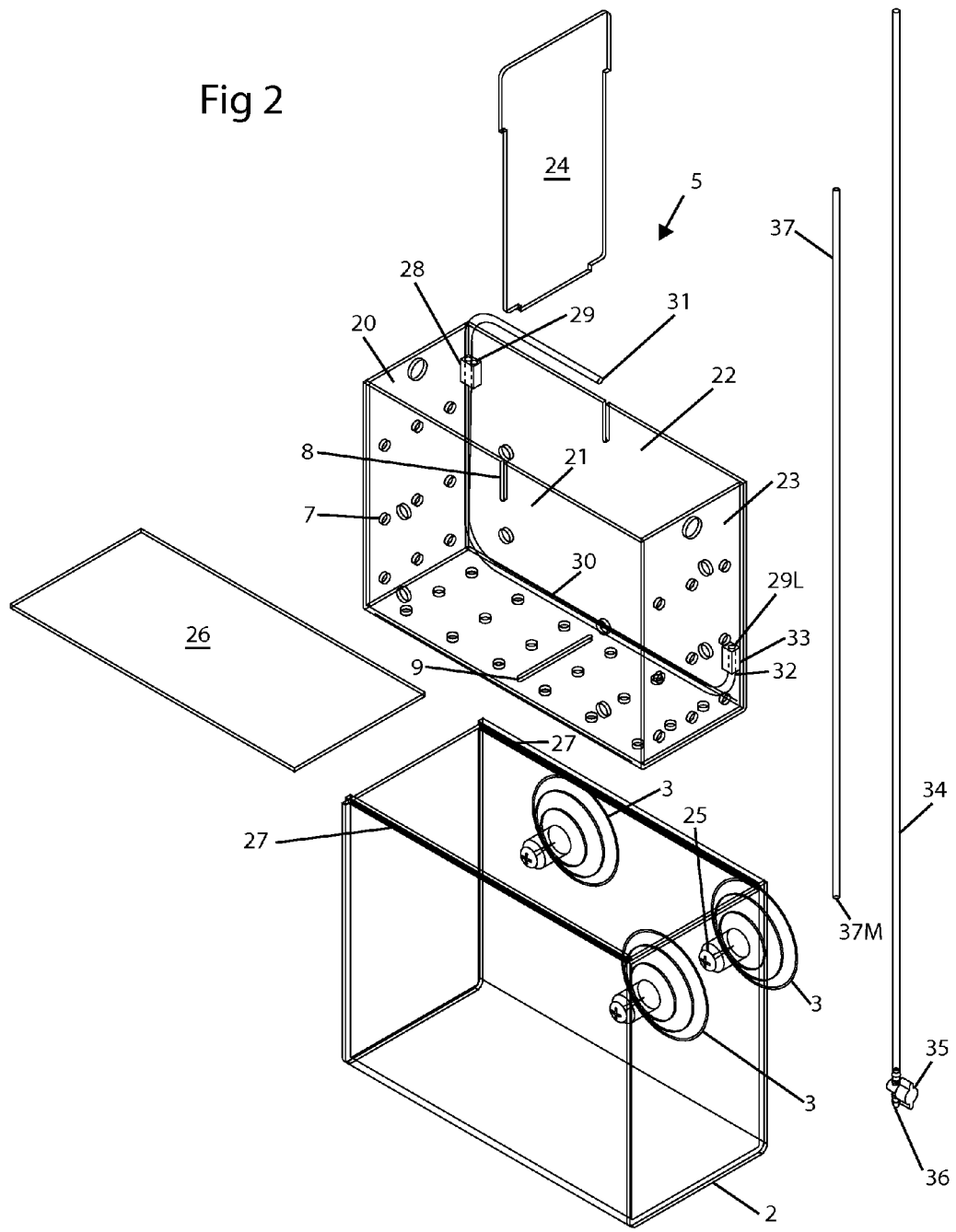
FIG. 2 is an exploded view of the transfer container assembly.

In FIG. 2 the lid 26 slides in grooves 27 for the transport and trapping mode. The threaded screws 25 attach the suction cups 3 to the transport container 2. Additional suction cups (not shown) can be pressed into the larger of the holes 7 in the inner container, thus allowing the inner container to be used alone, inside the aquarium as an isolation tank.

The double siphon system consists of an upper metering guide 28 having two thru channels 29. One thru channel secures a permanent siphon tube 30 having a connection end 31. The siphon tube 30 has a terminal end 32 connected to the lower metering guide 33. Lower metering guide 33 can have one or two thru channels 29L. The drain siphon tube 34 has a metering valve 35 with a connector nipple 36 that is connected to end 31 in operation for acclimation. A tank siphon tube 37 is inserted into thru channel 29L to start a siphon from the aquarium, thru tube 30 and out the drain siphon tube 34. Once that siphon is operational, the end 37M is moved to upper thru channel 29. Thus, aquarium water enters upper thru channel 29 into the transfer container 2. Simultaneously the water in the transfer container 2 siphons out thru channel 29L and thru tube 30 and out to drain thru tube 34 at equivalent rates.

Figure 3:
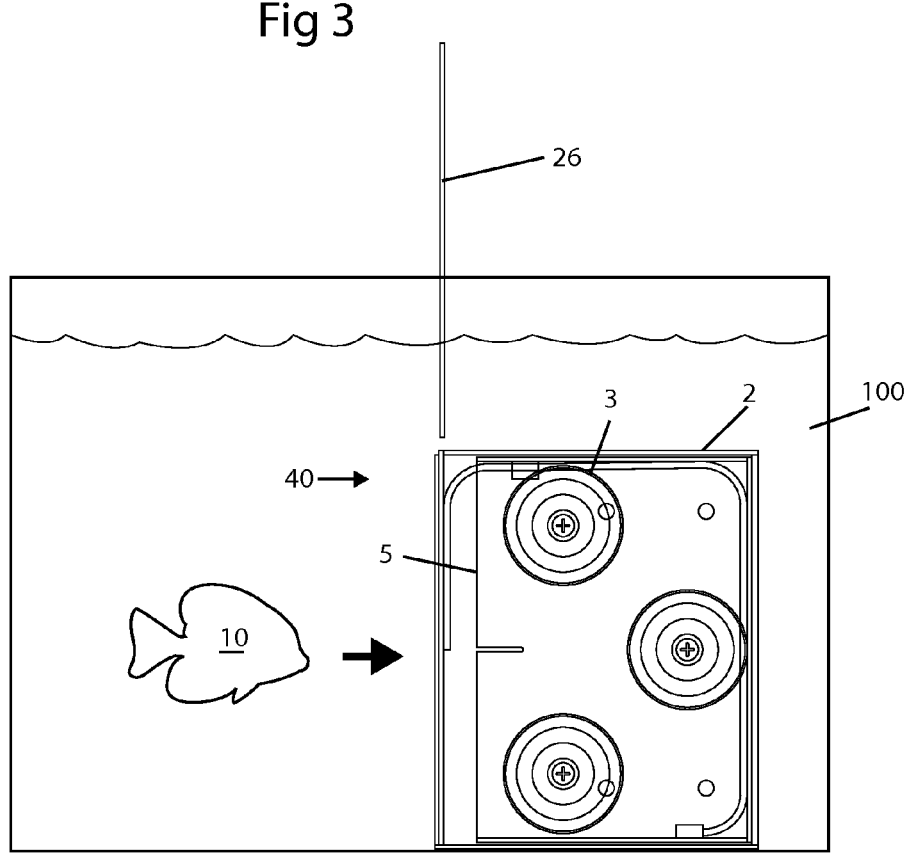
FIG. 3 is a front elevation view of the transfer container poised to trap a fish, mounted to the interior of the aquarium.
Figure 4:
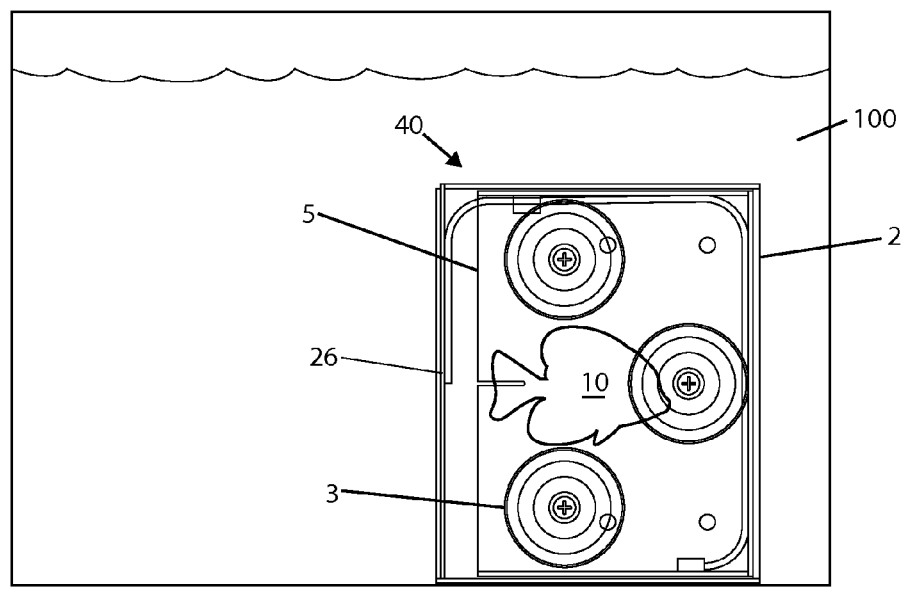
FIG. 4 is the same view as FIG. 3 with the fish trapped as the lid is lowered behind it.

Referring next to FIG. 3, 4 the transfer fish 10 is being captured in a store aquarium 100. The transfer container 2 is held on its side in FIG. 3 with its open top 40 exposed to fish 10. The fish 10 enters the open top 40 into transfer container 2 and lid 26 is lowered, capturing the fish. The transfer container 2 is removed and ready for transport to aquarium 1 shown in FIG. 1.

Figure 5:
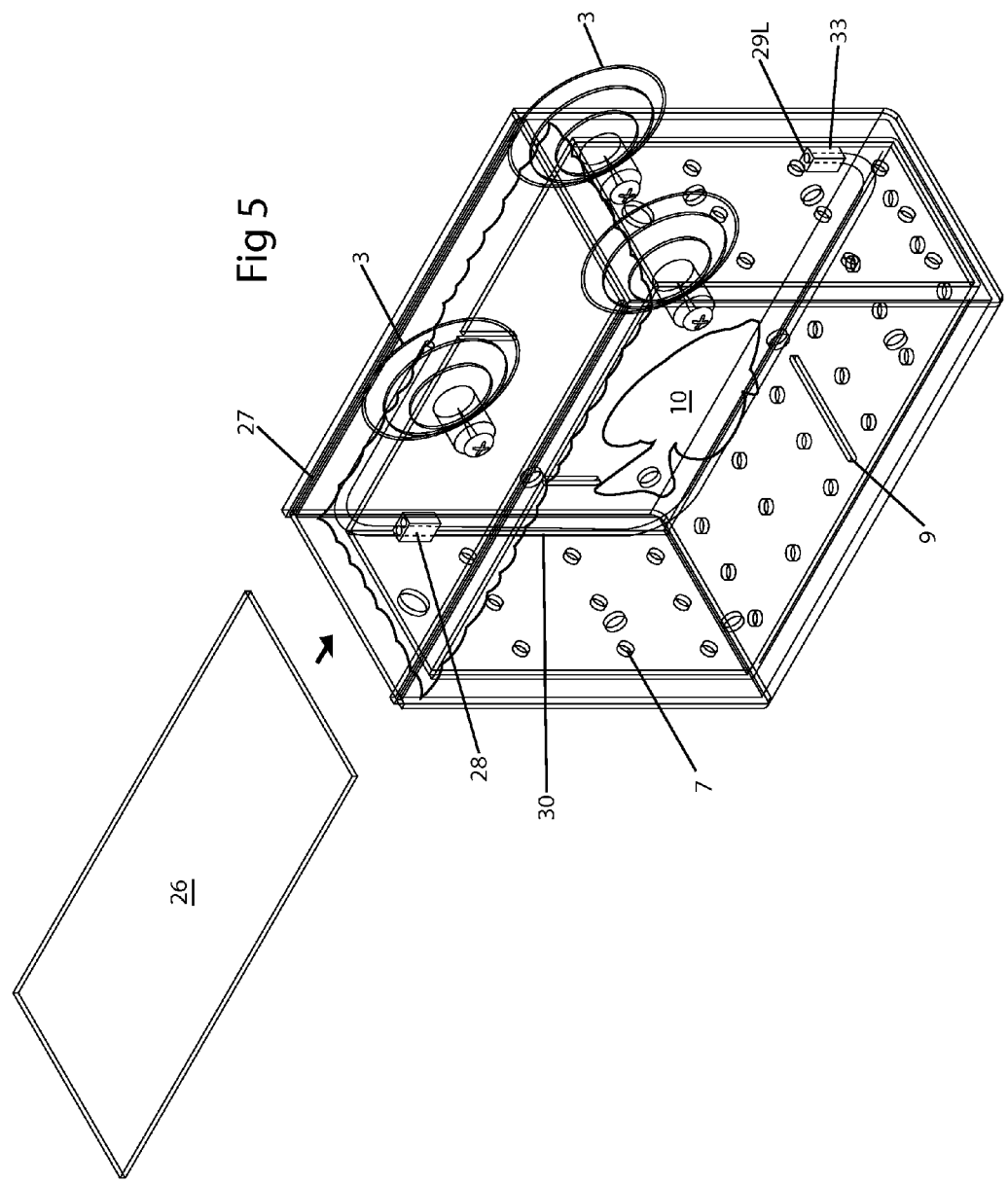
FIG. 5 is a top perspective view of the transport container ready for transport.
Figure 6:
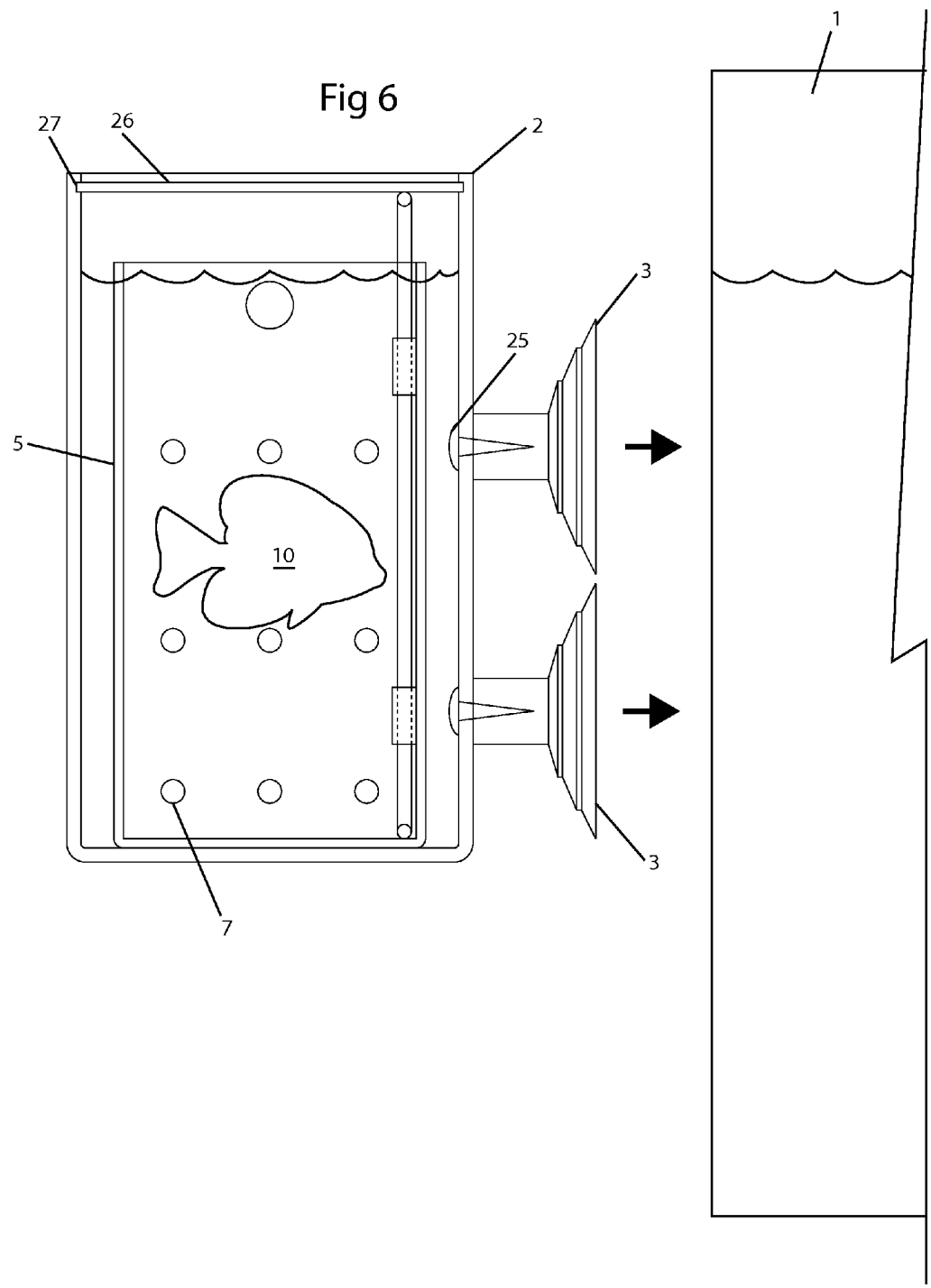
FIG. 6 is a side elevation view of the transport container being mounted to the exterior of an aquarium.

In FIG. 6 the transport container 2 is ready for transport. The lid 26 is being put in for transport to aquarium 1 of FIG. 5. In FIG. 5 the transport container 2 is mounted on aquarium 1 via suction cups 3.

Figure 7:
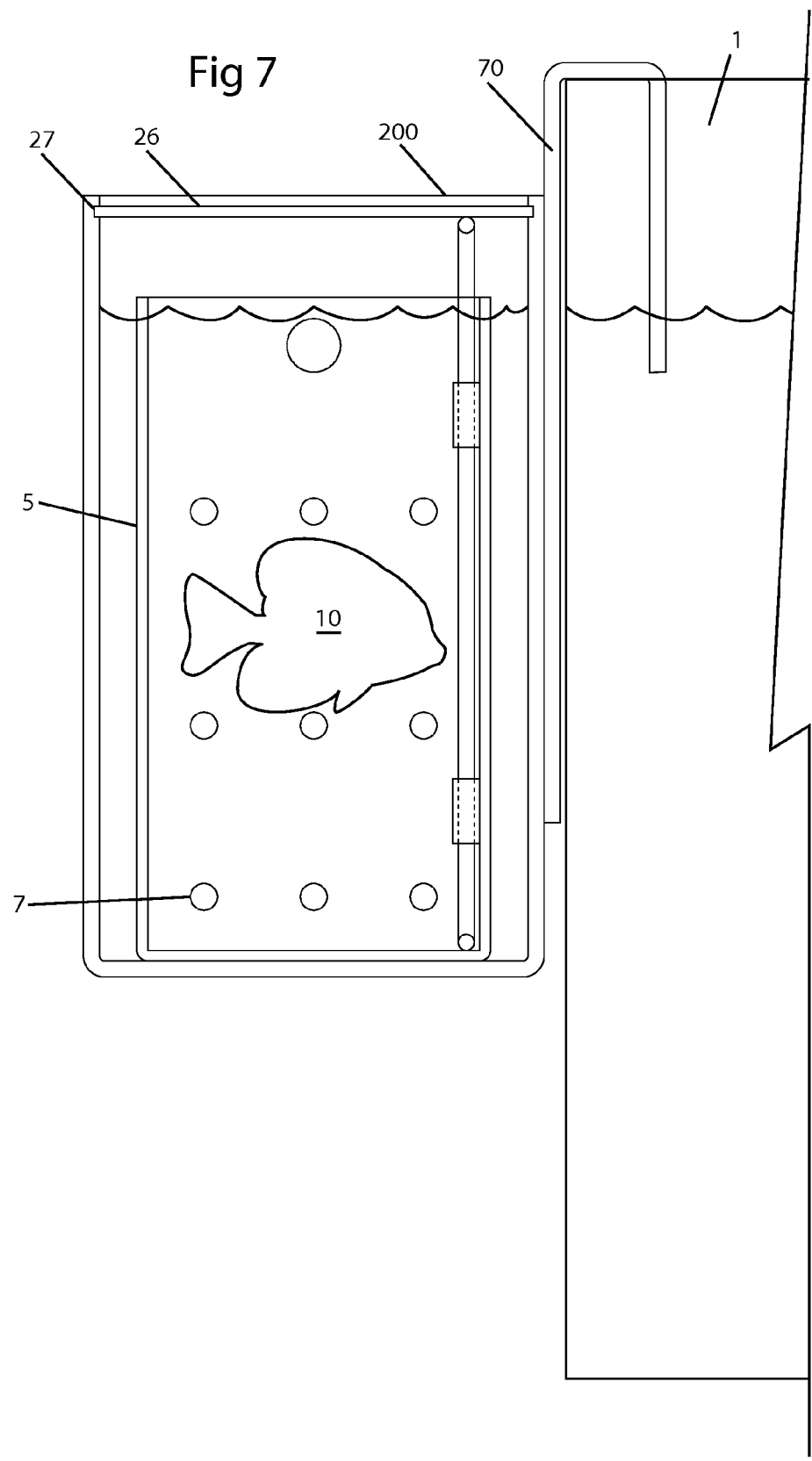
FIG. 7 is a side elevation view of a second embodiment transport being hung from an aquarium with a bracket.

In FIG. 7 an alternate mounting means, hanger 70, is part of the transport container 200. The hanger 70 secures the transport container 200 to the aquarium 1.

Figure 8:
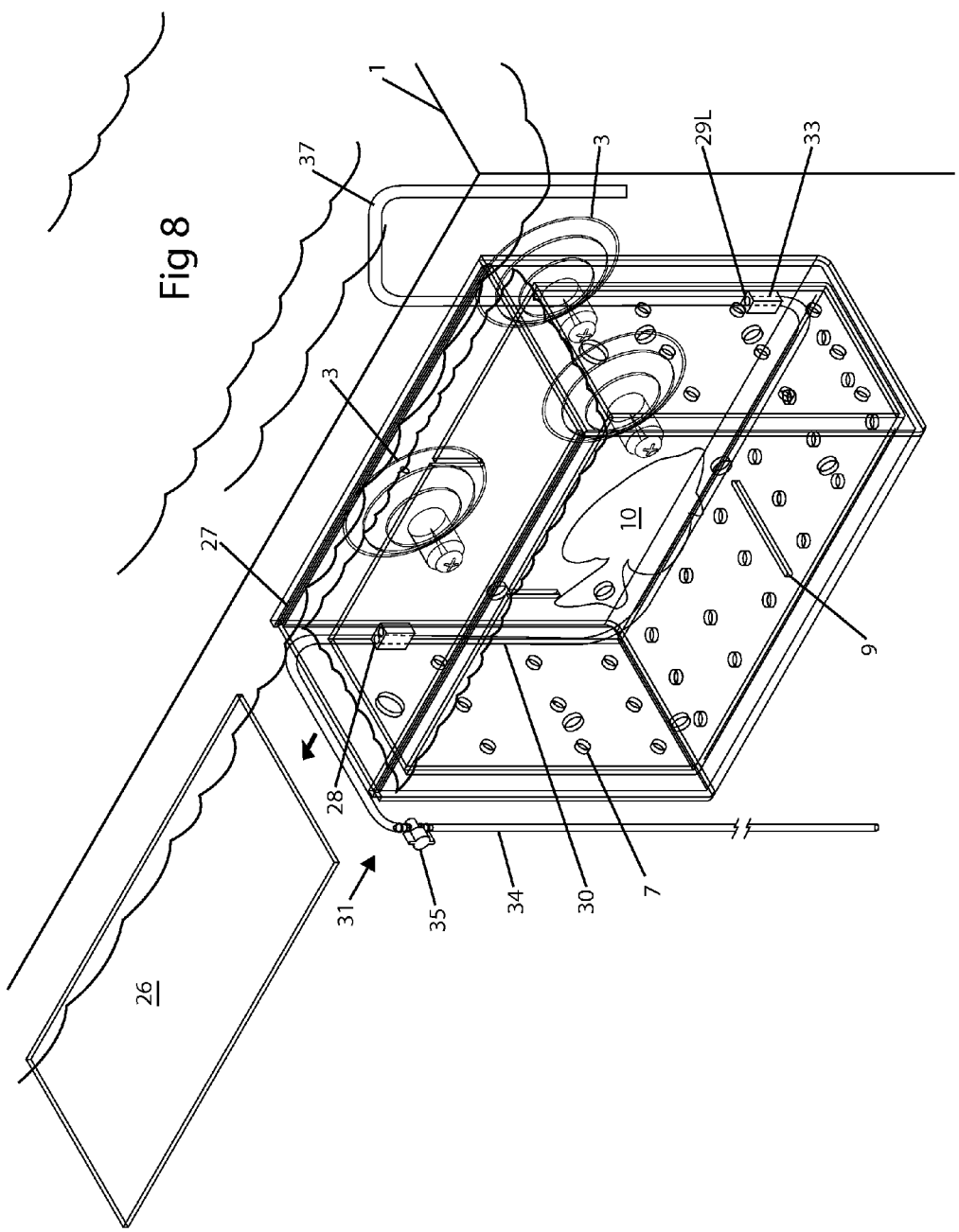
FIG. 8 is a top perspective view of the transport container mounted on the exterior of the aquarium in the configuration to start the double siphon.

Referring next to FIG. 8 the top 26 is removed. The first phase of siphon is shown connecting tube 34 to tube 30 at 31. The tube 37 is put into the aquarium 1 water with the end 37M put into thru channel 29L.

Figure 9:
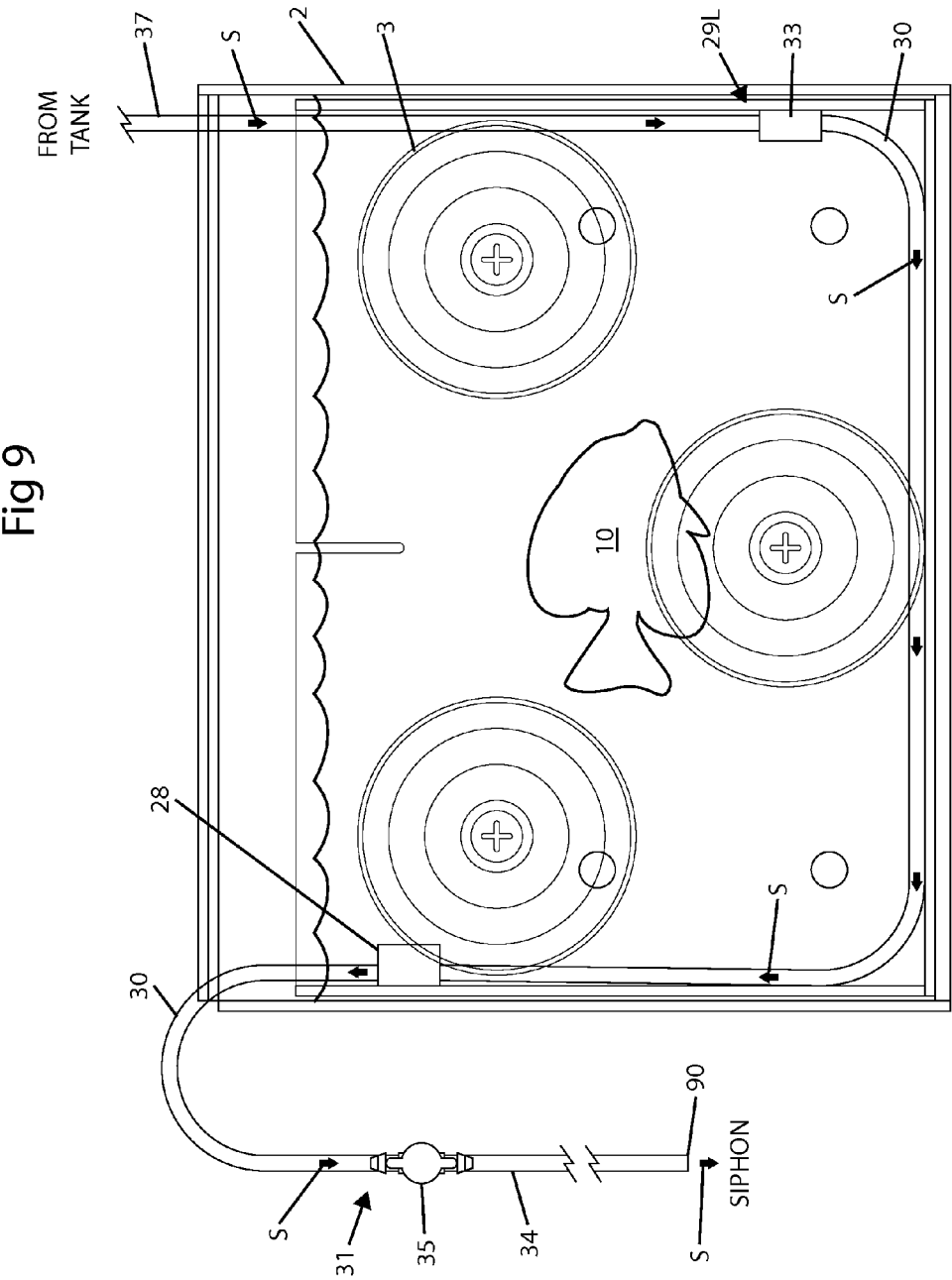
FIG. 9 is a front elevation view of the transport container showing the start of the siphon process.

In FIG. 9 the siphon has been initiated at tube end 90, perhaps by mouth. The aquarium water enters tube 37 shown by FROM TANK. Arrow 5 show the path of flow thru tube 30 to tube 34. This completes phase one which starts the double siphon.

Figure 10:
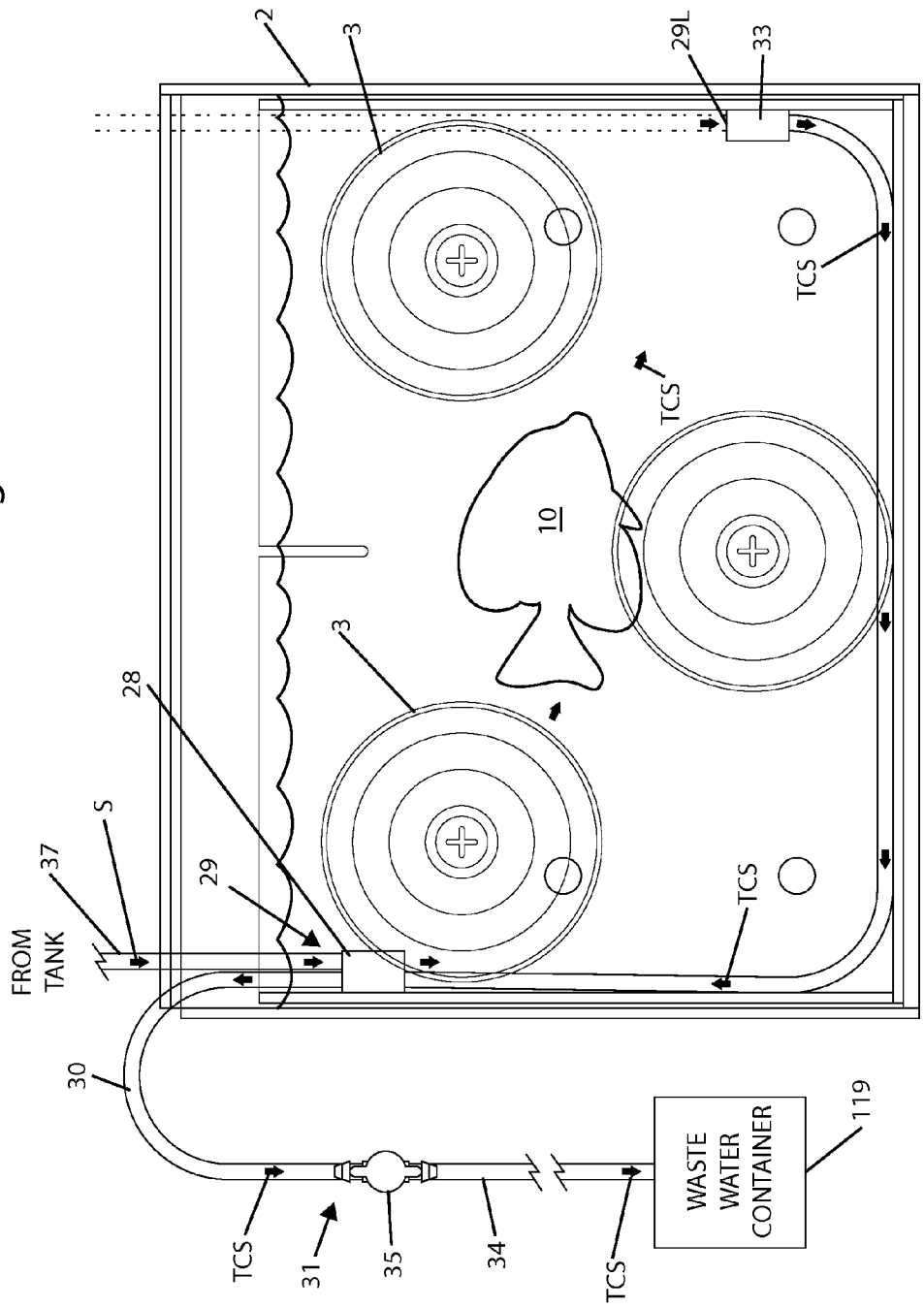
FIG. 10 is the same view as FIG. 9 showing the dual siphon process for acclimation.

Referring next to FIG. 10 the double siphoning, phase two, is complete. The tube 37 has been transferred from thru channel 29L to thru channel 29 on metering guide 28. The arrows 5 show the siphon from the aquarium 1 to the transfer container 2. Now the thru channel 29L is an inlet from transfer container 2 to tubes 30, 34. The metering valve 35 is set to the desired acclimation rate, from minutes to hours to replace all the water in the transfer container 2 with aquarium water. Arrows TCS indicate the second siphon flow to the drain labeled waste water container 119.

Figure 11:
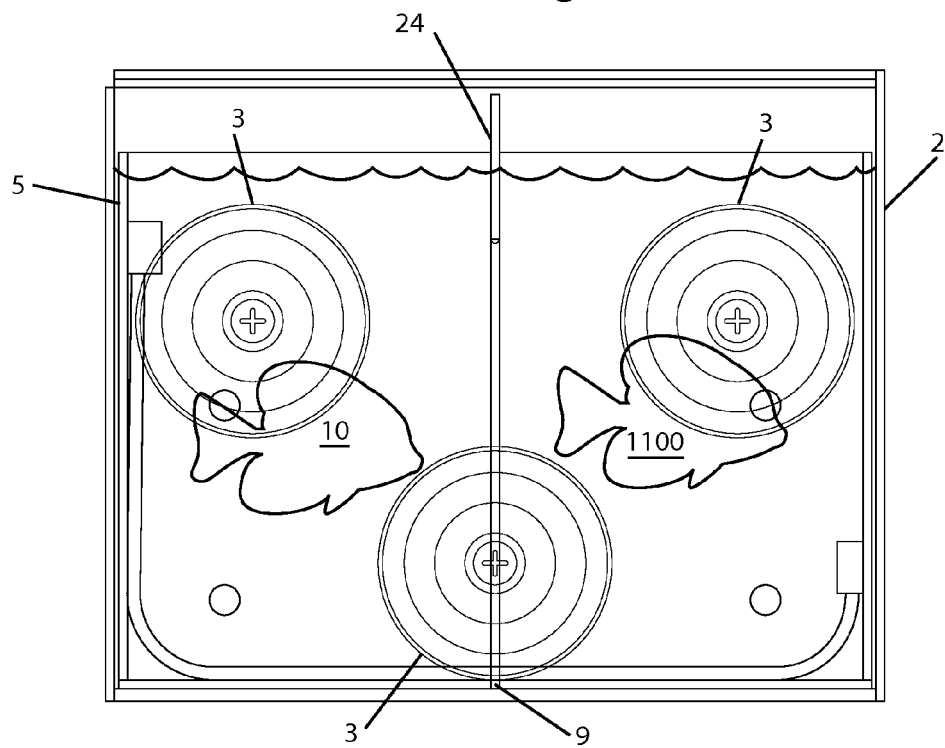
FIG. 11 is a front elevation view of the inner tank using the separator inside the transport case.

Referring next to FIG. 11 the inner container 5 can be used as in isolation tank using divider. Fish 10 is kept separate from fish 1100 either inside the container 2 or with inner container 5 mounted inside the aquarium (not shown).

Figure 12:
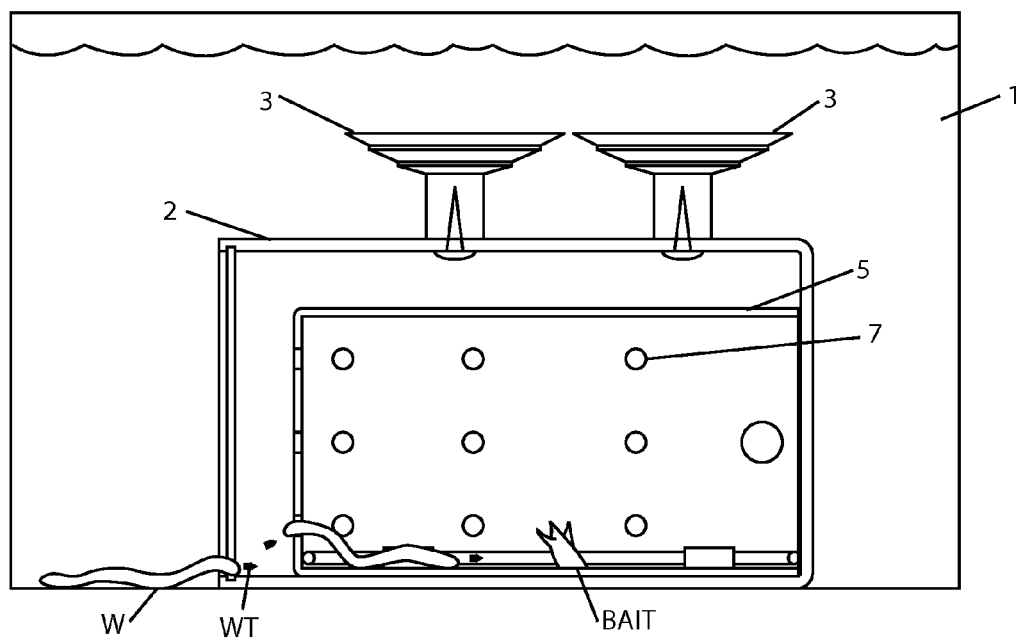
FIG. 12 is a side elevation view of the transport container used as a bristle worm trap inside an aquarium.

In FIG. 12 the inner container is placed with its open top at 1200 to seal it. The only portals are holes 7. Worm bait BAIT is set inside the inner container 5 to attract harmful worms W and other unwanted scavengers. The worm travels via arrows WT into the inner container 5. These trapped worms are removed from the aquarium 1.

Not shown is a dual siphon transfer system without an inner container that functions equivalently to the preferred embodiment regarding the dual siphon function.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

The invention claimed is:

1. A method to transfer a fish from a first aquarium to a second aquarium, the method comprising the steps of:
    forming an outer container to hold water;
    forming an inner container having holes and placing the inner container inside an open top of the outer container;
    mounting an upper metering guide having two thru holes in the inner container;

mounting a lower metering guide having one hole in the inner container;

connecting a first tube from the lower metering guide one thru hole to a thru hole in the upper metering guide and extending the first tube to outside the outer container to a drain end;

capturing a creature from the first aquarium in the outer and inner containers;

transporting the outer and inner containers from the first aquarium to adjacent the second aquarium;

inserting a siphon tube from the second aquarium to the inner container;

starting a siphon from the second aquarium thru the siphon tube to the lower metering guide to the first tube and out the drain end;

transferring the siphon tube inner container end from the lower metering guide to an empty thru hole in the upper metering guide thereby forming a first siphon from the aquarium thru the siphon tube and out the empty thru hole of the upper metering guide; and forming a second siphon from the lower metering guide thru channel to thru the first tube and out the drain end.

2. The method of claim 1, further comprising the step of transferring the creature by means of lifting the inner container, draining water, and placing into the second aquarium.

3. The method of claim 1, further comprising the step of mounting the outer container on the second aquarium.

4. The method of claim 1, further comprising the step of attaching a metering valve to the drain end.

5. The method of claim 1, further comprising the step of attaching a removable lid to the outer container.

6. The method of claim 4, further comprising the step of connecting an extension drain tube to the metering valve.

7. The method of claim 1, further comprising the step of mounting the outer container against the second aquarium.

8. The method of claim 7, further comprising the step of using suction cups for mounting the outer container to the second aquarium.

* * * * *